United States Patent
Van Der Weegen (10) Patent No.: US 7,041,248 B2
(45) Date of Patent: May 9, 2006

(54) MANUFACTURE OF DOME-SHAPED ARTICLES FROM THERMOPLASTIC FOAM SHEET MATERIAL TECHNICAL FIELD

(75) Inventor: Clemens Van Der Weegen, Newington (AU)

(73) Assignee: BioLayer Corporation Limited, Queensland (AU)

( * ) Notice: Subject to any disclaimer, the term of this patent is extended or adjusted under 35 U.S.C. 154(b) by 386 days.

(21) Appl. No.: 10/296,296

(22) PCT Filed: May 21, 2001

(86) PCT No.: PCT/AU01/00584

§ 371 (c)(1),
(2), (4) Date: Apr. 2, 2003

(87) PCT Pub. No.: WO01/89805

PCT Pub. Date: Nov. 29, 2001

(65) Prior Publication Data

US 2004/0026829 A1    Feb. 12, 2004

(30) Foreign Application Priority Data

May 23, 2000 (AU) .................................. PQ7693

(51) Int. Cl.
*B29C 51/08* (2006.01)
(52) U.S. Cl. ........................ 264/413; 264/321
(58) Field of Classification Search ............ 264/321, 264/554, 413; 425/135, 398, 436 R
See application file for complete search history.

(56) References Cited

U.S. PATENT DOCUMENTS

| 3,244,346 A | * | 4/1966 | Tijunelis | 206/521.1 |
|---|---|---|---|---|
| 3,562,859 A | * | 2/1971 | McIntyre | 425/310 |
| 4,327,049 A | * | 4/1982 | Miller | 264/138 |
| 4,555,378 A | | 11/1985 | Martin et al. | |
| 4,740,342 A | * | 4/1988 | Menard et al. | 264/549 |

(Continued)

FOREIGN PATENT DOCUMENTS

GB    1514369    6/1978

(Continued)

OTHER PUBLICATIONS

PCT International Search Report, Australian Patent Office, International Ser. No. PCT/AU01/00584 filed May 21, 2001, Jul. 4, 2001, 3 pages.

*Primary Examiner*—Allan R. Kuhns (57) ABSTRACT

A method and apparatus for making a dome-shaped sealing element for a vaginal speculum from an annular workpiece of closed cell polyethylene foam sheet material is described. The apparatus comprises a mould defining an open ended cavity having a circular cross-sectional shape smaller in diameter than the outside diameter of the workpiece, a loading station wherein said workpiece may be applied to the mould to rest on the mould to cover a mouth of said cavity, an insertion station wherein a plunger with a convex head forces the workpiece into said cavity so as to cause the workpiece to adopt a domed shape with a concave side directed towards the mouth of the cavity, a heating station wherein a radiant heating arrangement heats the concave side of the workpiece in the mould cavity to soften a surface layer thereof, a cooling station wherein the said surface layer is allowed to cool in the mould cavity, and an unloading station wherein a plunger with a concave head pushes the shaped workpiece from the cavity, a conveyor arrangement to shift the mould from station to station, and a control arrangement to effect coordinated operation of the conveyor arrangement and the respective plungers and radiant heating arrangement.

9 Claims, 13 Drawing Sheets

U.S. PATENT DOCUMENTS

| | | | |
|---|---|---|---|
| 5,007,976 A | * 4/1991 | Satterfield et al. | 156/222 |
| 5,116,275 A | * 5/1992 | Sassak | 446/48 |
| 5,562,873 A | * 10/1996 | Tornero | 264/161 |
| 5,643,517 A | * 7/1997 | Wu | 264/139 |
| 5,824,255 A | * 10/1998 | Ross et al. | 264/316 |
| 5,939,009 A | 8/1999 | Raley, Jr. et al. | |

FOREIGN PATENT DOCUMENTS

| | | |
|---|---|---|
| JP | 03274144 | 12/1991 |
| NL | 1006479 | 1/1999 |

* cited by examiner

MANUFACTURE OF DOME-SHAPED ARTICLES FROM THERMOPLASTIC FOAM SHEET MATERIAL TECHNICAL FIELD

TECHNICAL FIELD

This invention relates to the formation of dome-shaped articles, for example segments of a hollow sphere, ellipsoid, paraboloid or other smoothly curved solid of revolution, from initially substantially planar workpieces of thermoplastic foam sheet material.

One such article is useable as a sealing element, for a tubular vaginal speculum, of the kind that effects a seal between the speculum and the tissue defining the vaginal passage near the vaginal orifice. The present invention was devised with that application in mind and is described hereinafter primarily with reference thereto.

BACKGROUND ART

Insofar as a vaginal speculum sealing element is concerned, the only relevant background art known to the applicant is the speculum and sealing element described and claimed in applicants' earlier International patent application No. PCT/AU00/00267.

Insofar as the manufacture of shaped thermoplastic foam articles in general is concerned, typical prior art processes include injection moulding of mixtures of polymer and expansion agents, extrusion of such mixtures, cutting or sculpting stock slabs or sheets of foam with sharp knives or heated elements, and roll-forming or press-forming previously warmed foam sheet or strip.

SUMMARY OF THE INVENTION

Internal vaginal sealing elements must meet certain criteria not necessarily applicable to thermoplastic foam articles generally. They must be sterile and thus manufactured by a machine operable by a person using gloves, so as to come to the patient untouched by human hand.

Preferably the sealing element has a smooth resilient outer surface layer to promote sealing and reduce discomfort to the woman being examined.

Still further, as it is public policy for many Governments to encourage mass screening of women by means of a vaginal speculum to detect the onset of cervical cancer at an early stage of its development, it is essential that the process of manufacture of the sealing element for such a speculum is both quick and automatic to enable the finished sealing element to be inexpensive and thus adapted for use as a single use disposable item.

An object of the present invention is to provide a method and apparatus for making vaginal speculum sealing elements, which meet all of the above-mentioned criteria.

In its broadest aspect the invention consists in a method of making a dome-shaped article from a workpiece of thermoplastics sheet material, comprising the steps of selecting a workpiece of thermoplastics foam sheet material in the form of a substantially flat, flexible disk having a smoothly curved periphery, forcing the workpiece into a mould cavity having a cross-section with a periphery of substantially the same shape as that of the workpiece but of smaller size, so as to cause the workpiece to adopt a domed shape displaying a concave side, heating said concave side to soften a surface layer thereof, then ceasing said heating to allow said surface layer to cool and harden to cause the workpiece to become self-sustaining in shape, and then removing the shaped workpiece from the mould cavity.

In preferred versions of the invention as applied to the manufacture of a sealing element for a vaginal speculum, the workpiece periphery may be a circle. Furthermore, the workpiece may be pierced by a centrally placed hole, such that the finished sealing element, as it comes from the mould cavity, has a clearance hole at the apex of the dome through which the speculum may extend with an interference fit. In the most preferred embodiments the annular workpiece is dimensioned such the dome-shaped sealing element is substantially a hemi-sphere. In less preferred embodiments such a hole may be cut in the dome-shaped element after its removal from the mould cavity.

According to a second aspect of the invention it comprises apparatus for effecting the method of the invention comprising a mould defining said cavity, a loading station wherein said workpiece may be applied to the mould to rest on the mould to cover a mouth of said cavity, an insertion station wherein insertion means force the workpiece into said cavity so as to cause the workpiece to adopt a domed shape with a concave side directed towards the mouth of the cavity, a heating station wherein heating means heat the concave side of the workpiece in the mould cavity, a cooling station wherein the heated concave side of the workpiece is allowed to cool in the mould cavity, and an unloading station wherein ejection means remove the shaped workpiece from the cavity, conveyor means to shift the mould from station to station, and control means to effect coordinated operation of the conveyor means and the insertion means, heating means and ejection means.

For preference the mould is one of a batch of moulds shifted as one from station to station and the insertion means, heating means and ejection means operate simultaneously on each mould of the batch in the insertion station, heating station and unloading station respectively.

BRIEF DESCRIPTION OF THE DRAWINGS

By way of example an embodiment of the above-described invention is described in more detail hereinafter with reference to the accompanying drawings.

BEST MODE OF PUTTING THE INVENTION INTO EFFECT

The apparatus illustrated by the drawings is suitable for the production of vaginal probe sealing elements.

Figure 1:
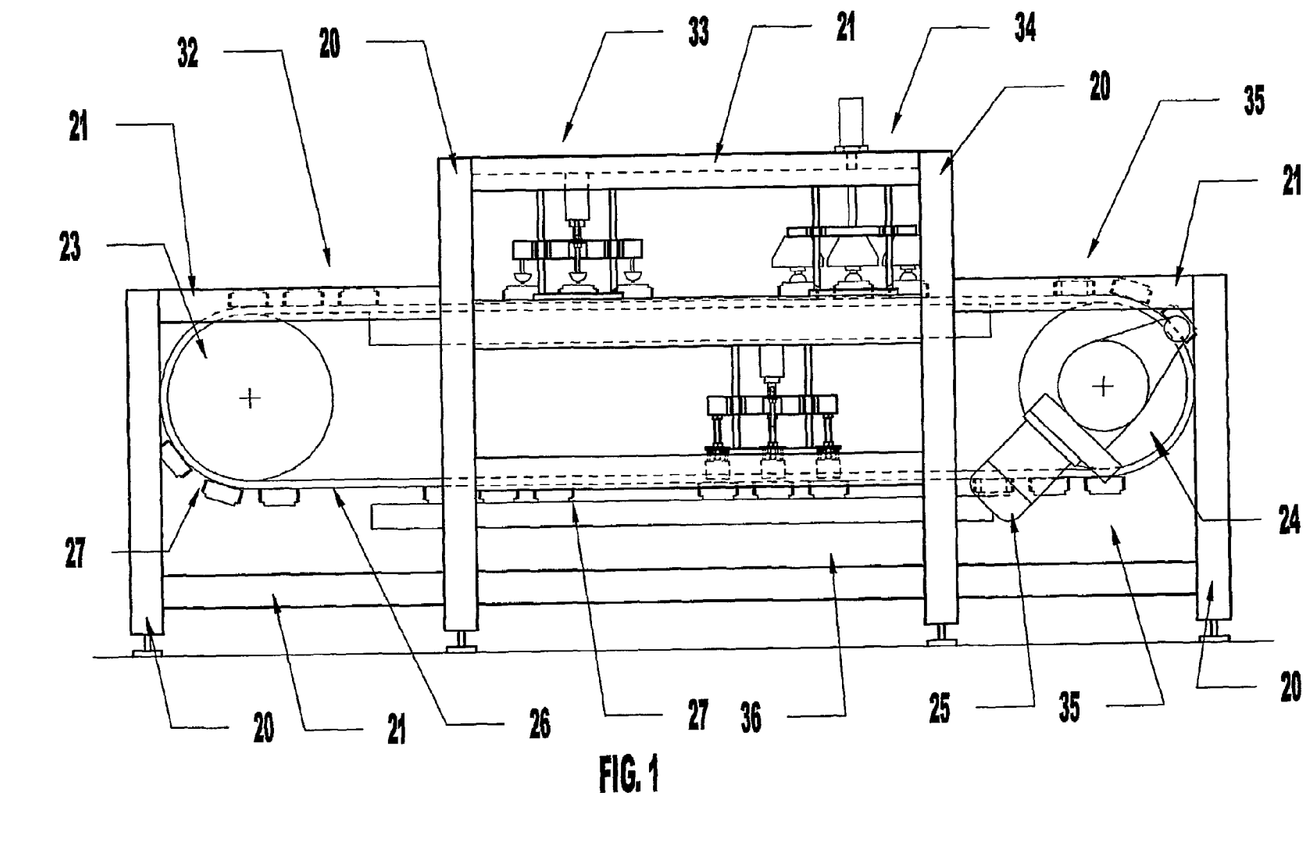
FIG. 1 is a diagrammatic side elevation of an apparatus according to the invention.
Figure 2:
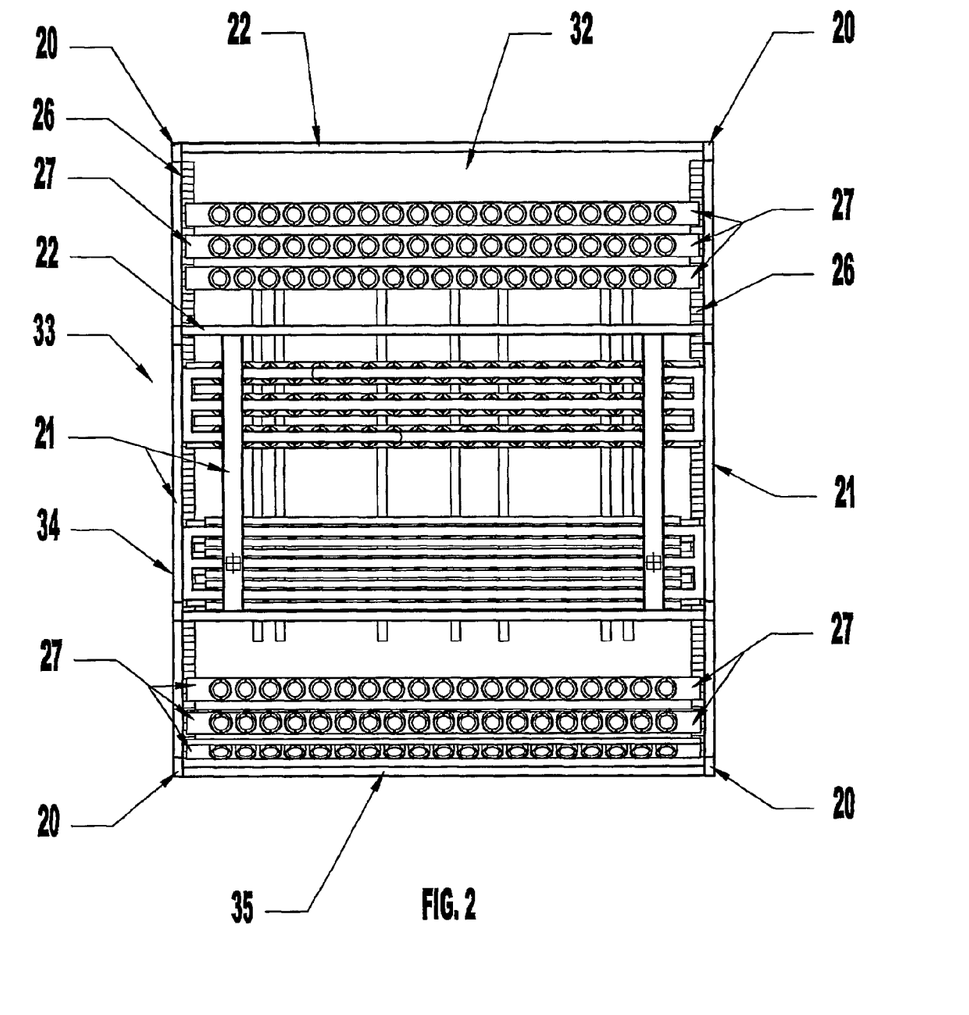
FIG. 2 is a diagrammatic plan view of the apparatus of FIG. 1 drawn to a smaller scale.

It comprises a structural frame comprising posts 20, longitudinal rails 21 and transverse rails 22 supporting the operative components of the apparatus. Those operative components include conveyor means comprising driven sprockets 23, driving sprockets 24 rotated in unison by a gear motor 25, two conveyor chains 26 trained around respective pairs of the sprockets and a plurality of channel-sectioned cross-beams 27 extending between and secured to corresponding links of the chains 26.

Figure 3:
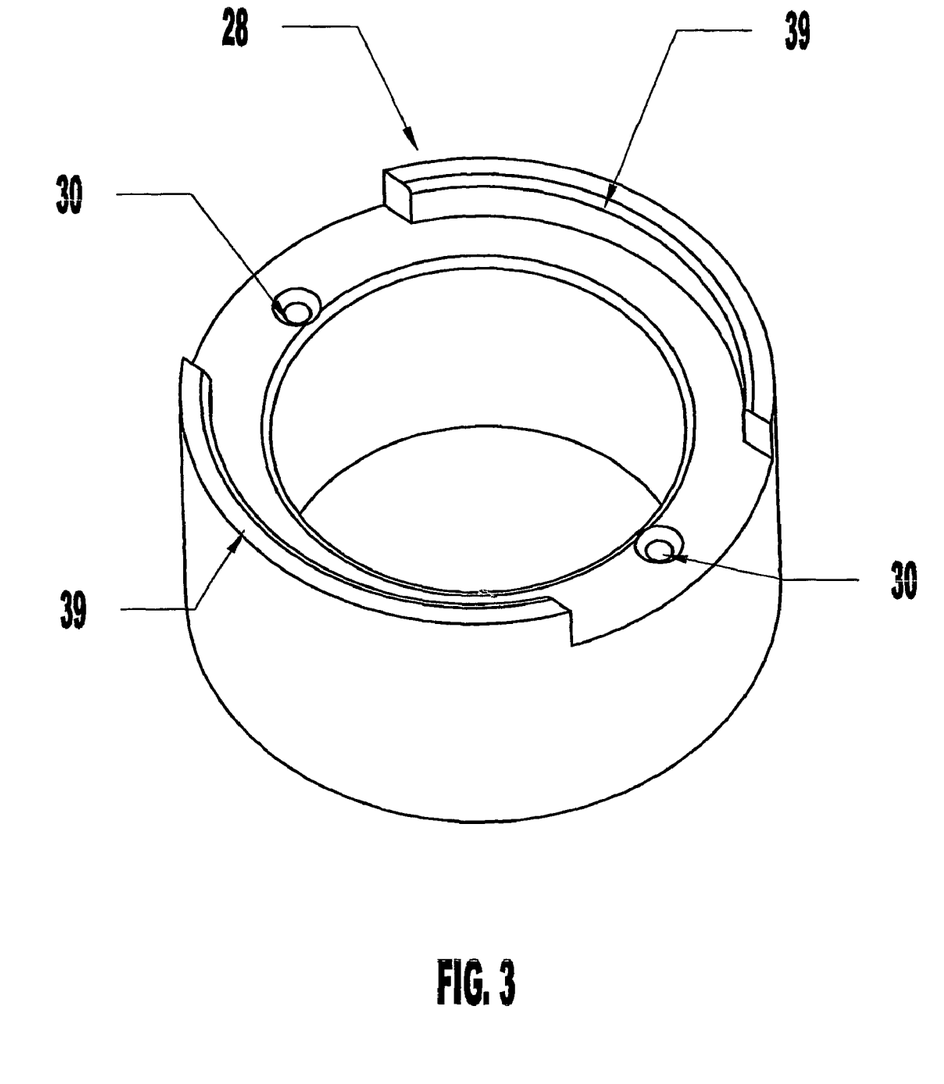
FIG. 3 is an isometric view of a mould, being a component of the apparatus of FIG. 1 drawn to an enlarged scale.
Figure 10:
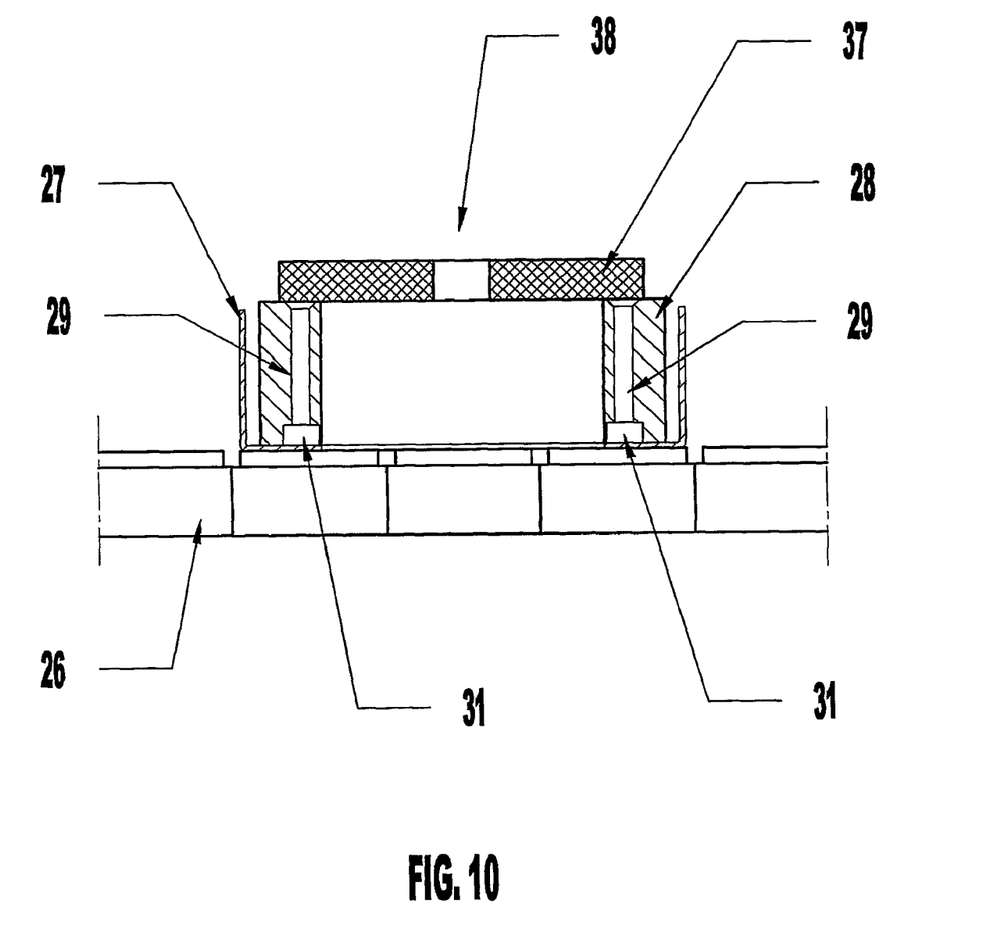
FIG. 10 is a sectional elevation of a single mould of a batch of moulds in the loading station of FIG. 4 drawn to a larger scale.

Each cross-beam 27 has a row of open ended, generally cylindrical moulds 28 secured to the web of the cross-beam 27. As can best be seen in FIG. 10, each mould 28 is secured to its associated cross-beam 27 by two flat-head machine screws 29 extending through counter-sunk clearance holes 30 (see FIG. 3) within the wall thickness of the mould into threaded bores in bosses 31 fixed to the web of the cross-beam 27. Furthermore each web of the cross-beam is pierced by openings in respective alignment with the mould cavities so that (as will be made clear below) a shaped or completed workpiece (although normally retained in the cavity of a mould by friction) may be readily pushed from the mould cavity through the corresponding hole in the cross-beam, as and when required.

The illustrated apparatus operates on successive, spaced apart batches of workpieces as they progress from station to station through the apparatus. To that end the cross-beams 27 are arranged in spaced apart groups. In the present instance there are three cross-beams 27 in each group and there are nineteen moulds 28 on each beam. Thus, batches of fifty-seven moulds may be shifted from station to station for simultaneous operation on that number of workpieces in each station, by appropriate intermittent operation of the conveyor means. The dwell time in all of the stations is thus equal to that of the station requiring the longest time to process a batch of workpieces. Usually that slowest station is the loading station.

There are five such stations, namely a loading station 32, an insertion station 33, a heating station 34, a cooling station 35 and an unloading station 36.

Figure 4:
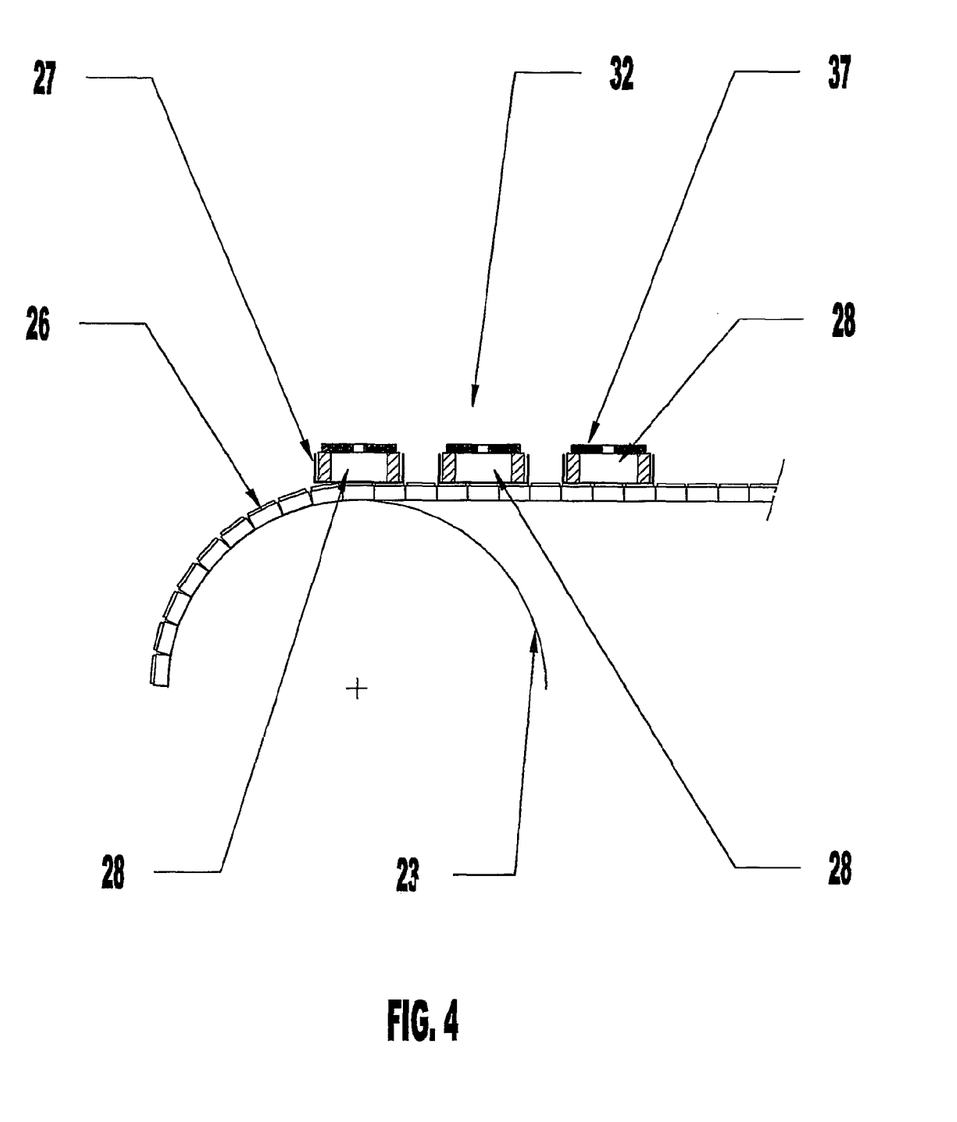
FIG. 4 is a diagrammatic side elevation of a loading station of the apparatus of FIG. 1 drawn to a larger scale.

The loading station 32 is no more than an exposed portion of the upper flight of the conveyor means at a height above floor level such than one or more operators or an automated loading mechanism (not shown), may conveniently load a workpiece 37 onto each mould 28 in the loading station while the conveyor means are stationary.

In the present instance each workpiece 37 is an annulus previously cut from a flat sheet of a relatively dense, closed cell, pharmaceutically acceptable, thermoplastics foam, for example polyethylene foam. The foam is resilient and smooth surfaced. The outer diameter of the annulus is such that the finished dome-shaped workpiece is adapted for use as a sealing element for a vaginal speculum. The central hole 38 (see FIG. 10) of the annular workpiece is sized to accommodate a tubular probe of a vaginal speculum extending neatly through that hole. The fit between the workpiece and probe is sufficiently tight to ensure that the junction between the probe and the finished sealing element is able to withstand the required air pressure within the vagina without substantial leakage.

The workpieces may be pre-cut from a stock sheet of thermoplastic foam by a conventional, automatic cutting machine. For example, a machine comprising a reciprocating cutting head furnished with circular knives, which cut through the sheet against a cutting table, as the sheet is drawn across the table intermittently, in synchronism with the rise and fall of the cutting head. Such machines are well known and require no further description herein.

Each mould 28 (see FIG. 3) has a peripheral locating flange 39 adapted to partly surround the annular workpiece when loaded onto the mould to ensure that the workpiece is then co-axial with the mould. In this embodiment the flange 39 has two gaps in it to provide clearance between the flange and the heating means, as the moulds are moved though the heating station.

Once the moulds have been loaded at the loading station the operator may press a push button or otherwise send a start signal to control means including a Programmable Logic Array (PLA) or a programmable logic controller, or other like "computerised' controller, providing for automatic operation of the apparatus. If all of the succeeding stations are in the "ready" condition, that is to say the operating means in each station have completed their preceding operation, the control means energise the conveyor means, so as to advance each batch of moulds from one operating station to the next. Thus the loaded batch of moulds in the loading station 32 is advanced to the insertion station 33.

Figure 5:
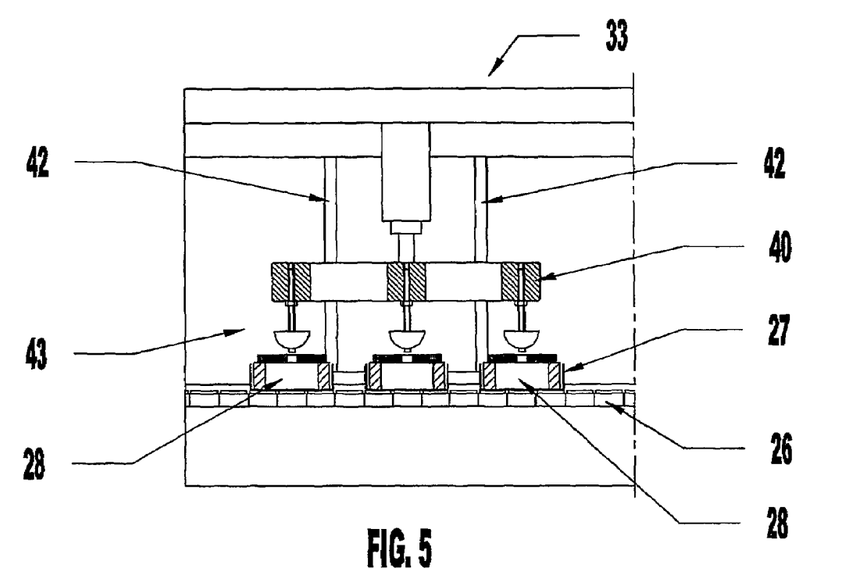
FIG. 5 is a diagrammatic side elevation of an insertion station of the apparatus of FIG. 1 drawn to a larger scale, showing the insertion means of that station at the upper end of an operating stroke.
Figure 6:
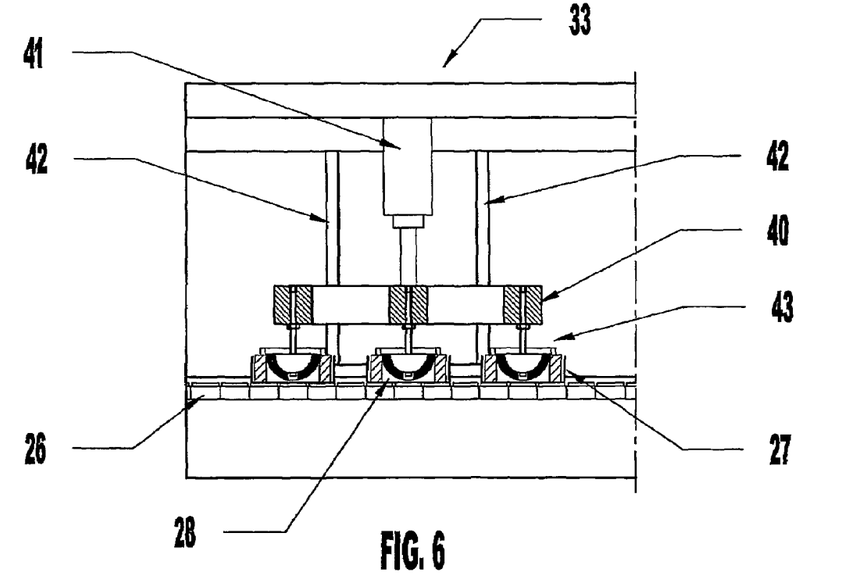
FIG. 6 is a view similar to FIG. 5 showing the insertion means at the lower end of an operating stroke.

The insertion means at the insertion station (see FIGS. 5 and 6) comprise a platen frame 40 able to rise and fall under the influence of two double acting pneumatic thrustors 41 (one near each end of the frame 41) on two pairs of guide rods 42, and fifty-seven plungers 43 in respective alignment with the moulds in the insertion station.

Figure 11:
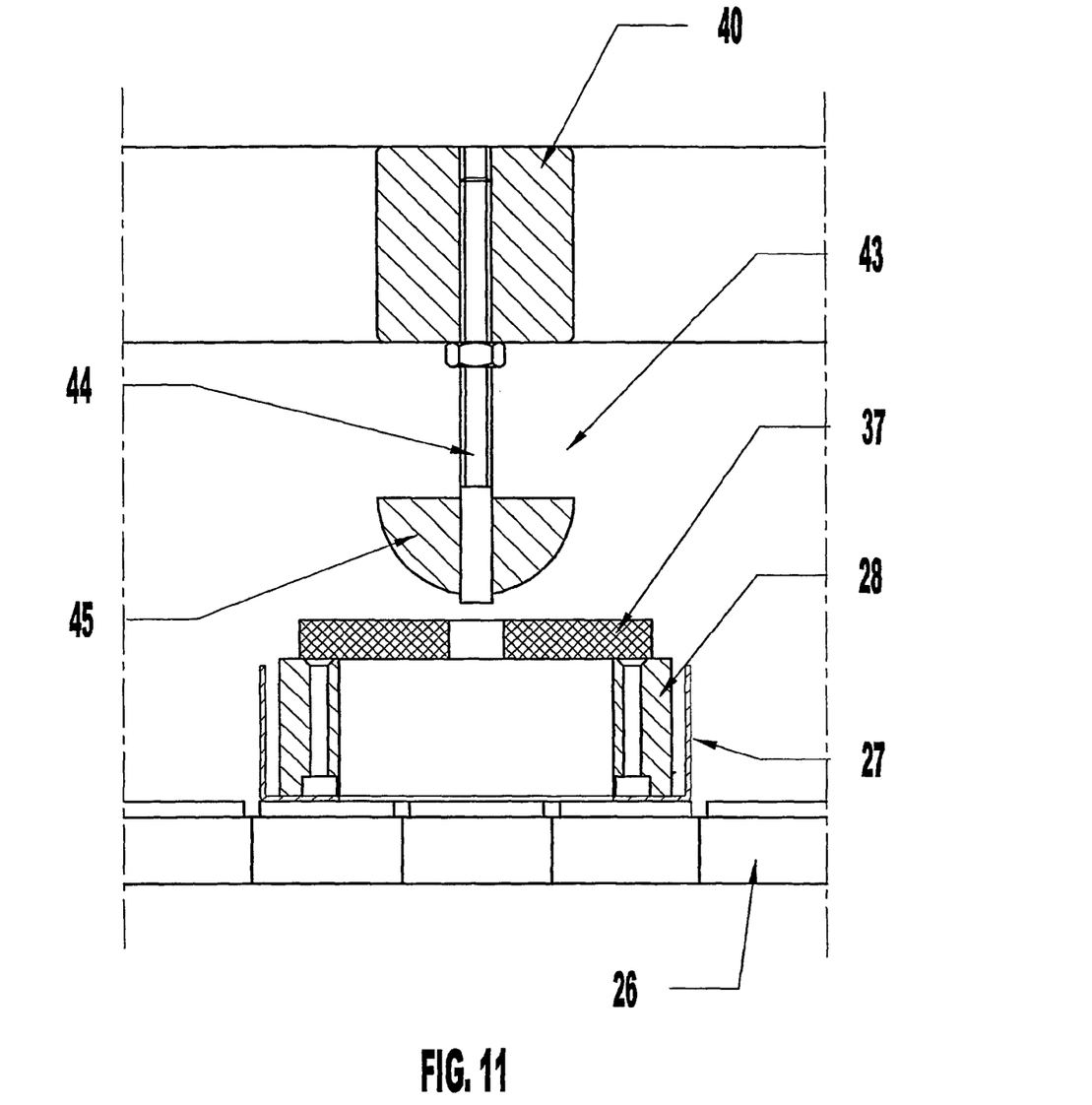
FIG. 11 is a sectional elevation of a single unit of the insertion means shown in FIG. 5 drawn to a larger scale.
Figure 12:
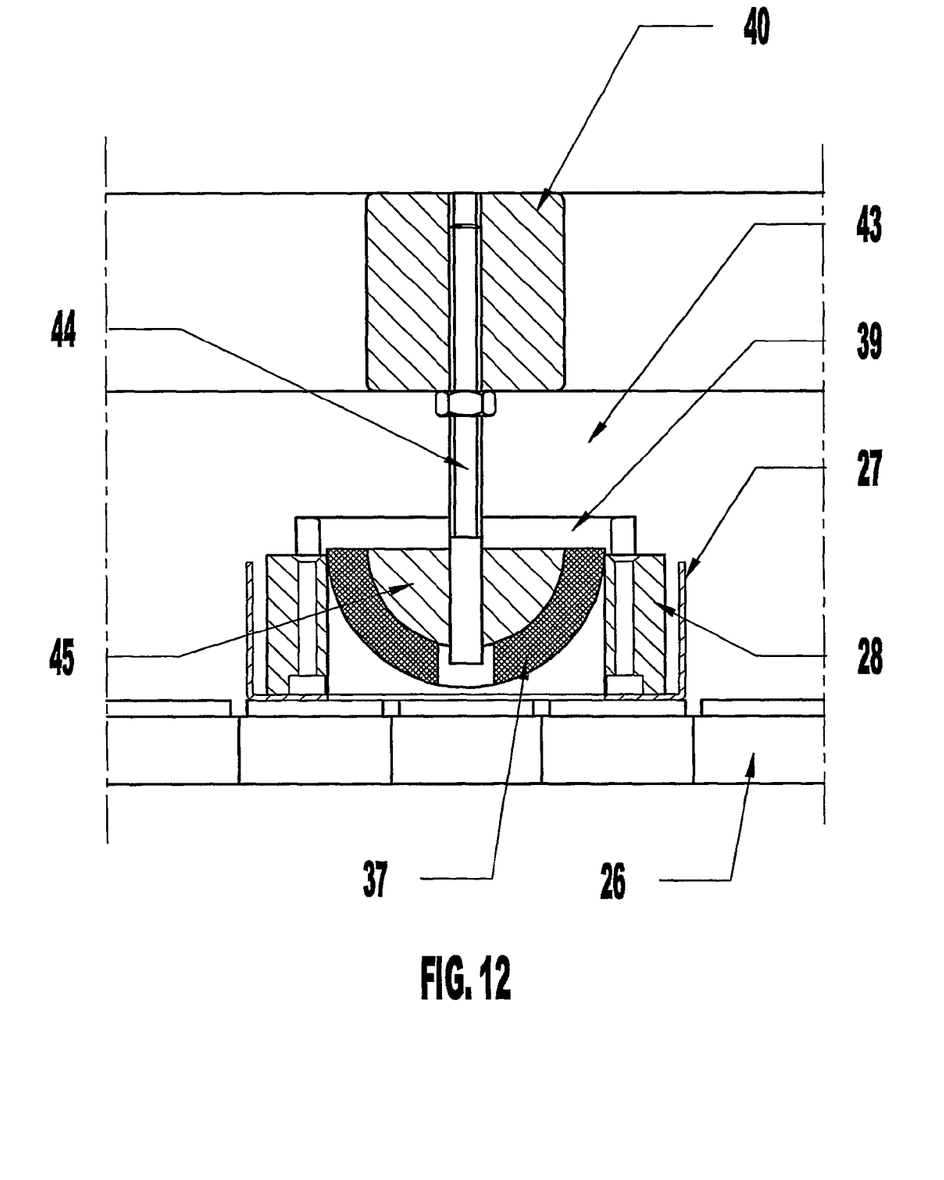
FIG. 12 is a sectional elevation of a single unit of the insertion means shown in FIG. 6 drawn to a larger scale.

As may best be seen in FIGS. 11 and 12, each plunger 43 comprises a plunger rod 44 and a hemi-spherical plunger head 45. The curved convex surface of the plunger head 45 preferably conforms to the required concave surface of the finished sealing element. As the plunger 43 descends from the upper (FIG. 11) position to the lower (FIG. 12) position it pushes the workpiece 37 ahead of it into the mould cavity, causing it to adopt the required domed shape.

It will be noted that the plunger head 45 is furnished with a downwardly projecting a central boss 46. That boss serves to displace any wad of the original sheet material that may be retained in the central hole of the annular workpiece.

Figure 13:
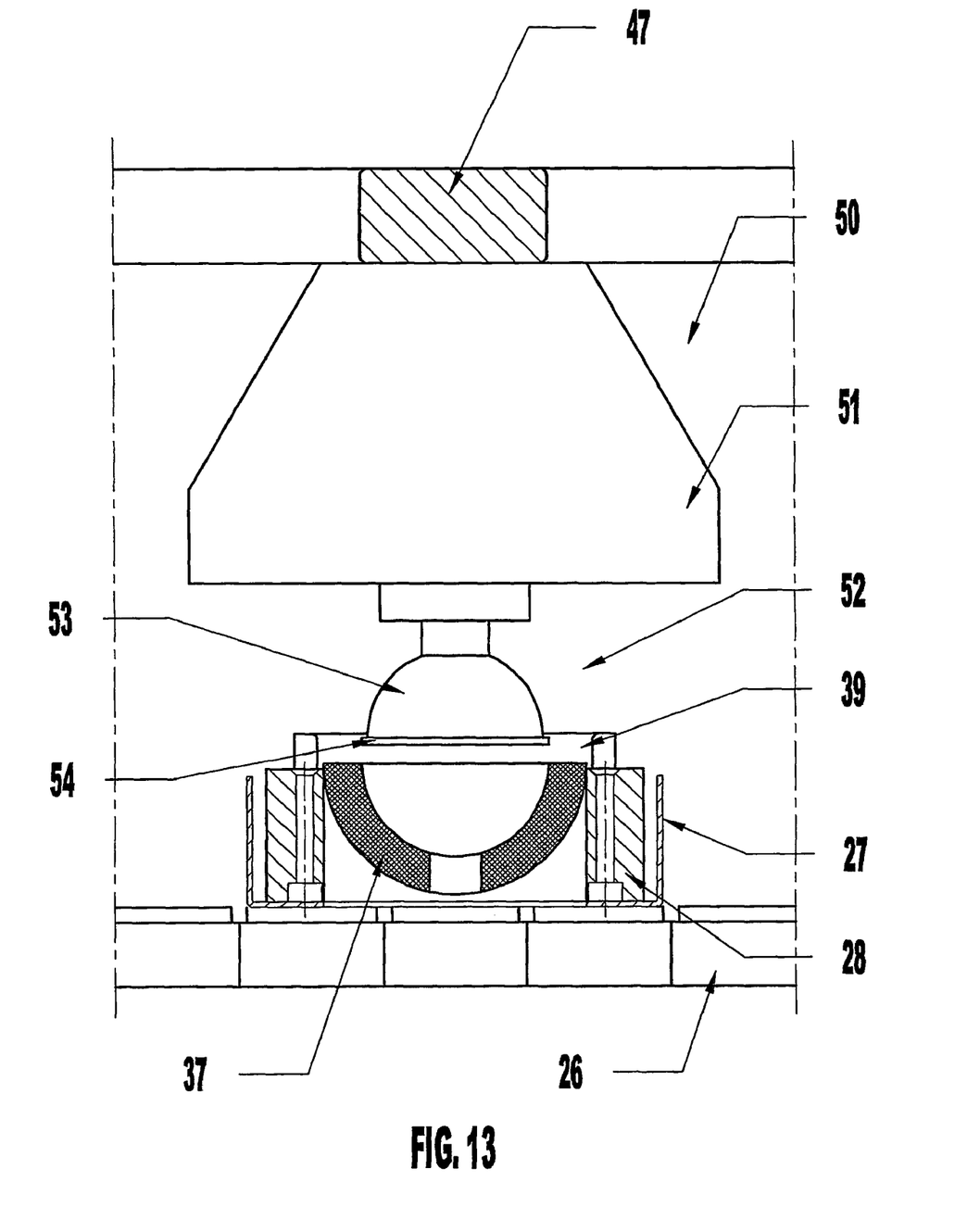
FIG. 13 is a partly sectioned side elevation of a single unit of the heating means shown in FIG. 7 drawn to a larger scale.

When the plunger retracts to the upper position the domed workpiece 37 is retained by friction within the mould cavity, as shown in FIG. 13.

If and when a further start signal is given to the PLA and all of the stations are once more ready, the conveyor means are caused to move through a further step and deliver the moulds holding the domed workpieces from the injection station 33 to the heating station 34.

Figure 7:
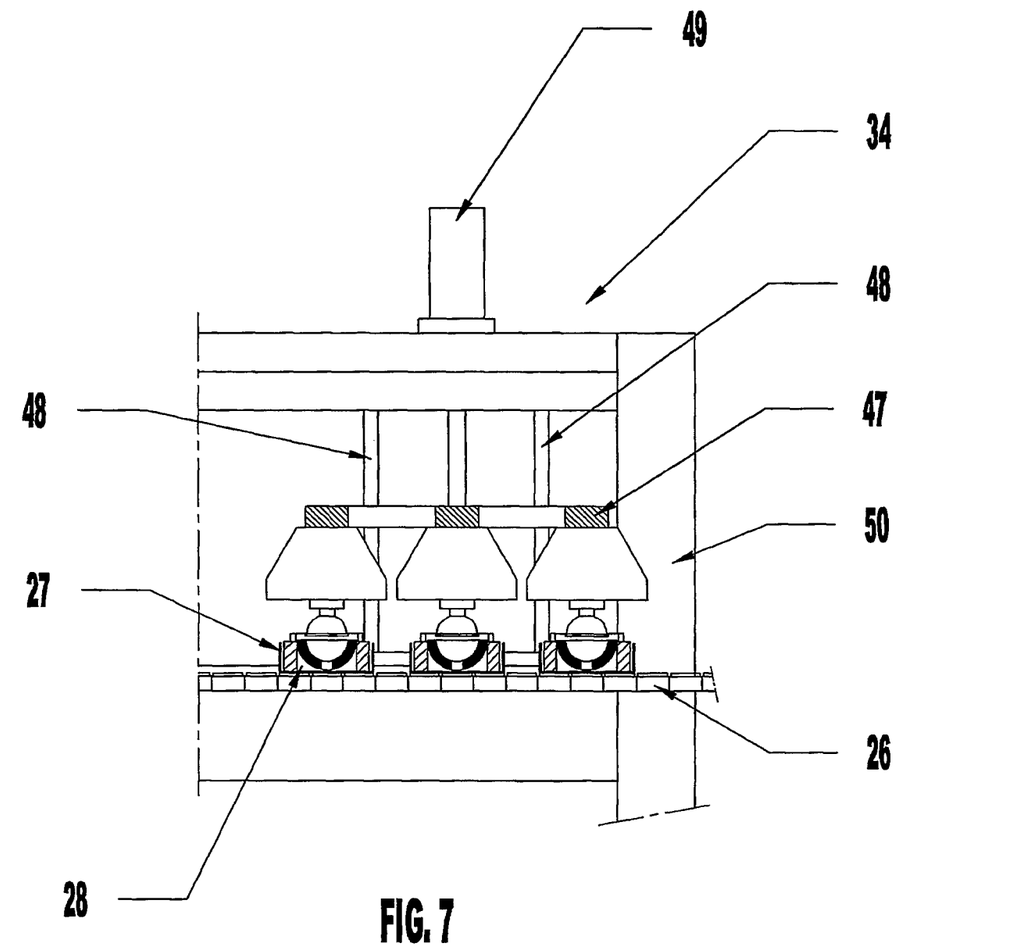
FIG. 7 is a diagrammatic side elevation of a heating station of the apparatus of FIG. 1 drawn to a larger scale.

As may best be seen from FIG. 7, heating station 34 comprises a platen frame 47 able to rise and fall on guide rods 48 under the action of a pneumatic thrustor 49 and supporting an array of fifty-seven heating units 50. The heating units 50 are in respective alignment with the moulds 28 as delivered into the heating station.

As may best be seen from FIG. 13, each heating unit 50 comprises a generally frusto-conical heat shield 51 disposed above a conventional low voltage lamp assembly including a miniature luminaire 52. Such assemblies and their miniature luminaires are well known for use as spot lamps in building illumination systems. The luminaire comprises a generally parabolic reflector 53 with a colourless transparent window 54 closing the otherwise open end of the reflector and a miniature incandescent light bulb (not shown) mounted within the reflector with an incandescent element substantially coinciding with the focus of the reflector. Although primarily intended for the production of light, such light bulbs also generate considerable heat. That heat is radiated through the window 54 onto the concave surface of the corresponding workpiece 37.

The radiated heat impinging on the workpiece raises the temperature of a concave surface layer thereof. The temperature reached depends primarily on the wattage of the lamp and the time of exposure of the workpiece to the radiated heat. The distance of the surface from the lamp is of lesser significance because the radiation beam is contained and, at the short distance involved, virtually all of the energy falls on the workpiece. Thus the PLA controls the heat input primarily by determining the time of exposure rather than by regulating the distance of the luminaire from the workpiece. Preferably the PLA controls the effective heating time by powering down the lamps to say ten percent of their nominal output at the end of the required period, rather than by immediately switching the lamps on and off. This markedly increases the working life of the individual bulbs. The array of heating units can be raised up from its operating position close to the moulds in the heating station, by the thrustor 49, but this is done to facilitate the replacement of burnt-out bulbs rather than as a heating control measure.

The heating is continued as needed to soften a surface layer of the workpiece. The temperature rise is confined to the surface layer because of the short duration of the heating and the fact that thermoplastics foams are normally very good thermal insulators with low coefficients of conduction. Thus the heating has little effect on the physical properties of the workpiece as a whole. Nevertheless it softens the surface layer and relieves the compressive stress in the surface layer due to its distortion into a domed shape. In experiments leading to the present invention it was found that provided the softened surface layer is maintained in the curved position until it has cooled and re-hardened, then its resistance to tensile strain is sufficient to render the domed shape of the workpiece as a whole self sustaining.

At the end of the heating step, which is always of more duration than the almost instantaneous insertion step, the PLA causes the conveyor means to operate and shifts the batch of the moulds from the heating station 34 into the cooling station 35.

The cooling station 35 may be no more than a length of the conveyor path that is exposed to room temperature. Cooling is normally slower than heating and in the present instance the length of conveyor in the cooling station is such that each batch of moulds normally dwells in the cooling station for two of the dwell times applicable to the, insertion, heating and unloading stations. Of course that could be extended to further dwells in the cooling station, or forced cooling could be employed, if only a short dwell time is needed in the heating station, for example, due to increasing the wattage of the heating units.

On the next operation of the conveyor means, the batch of moulds then progresses into the unloading station 36. Having passed around the driving pulley 24, the batch of moulds arrives in the unloading station in an inverted disposition.

Figure 8:
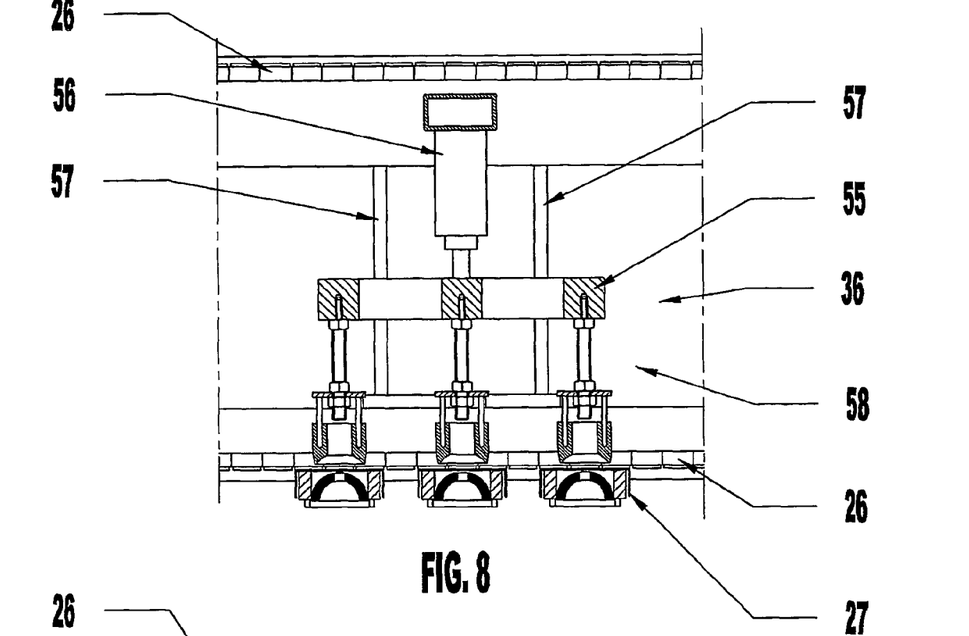
FIG. 8 is a diagrammatic side elevation of an unloading station of the apparatus of FIG. 1 drawn to a larger scale, showing the ejection means of that station at the upper end of an operating stroke.
Figure 9:
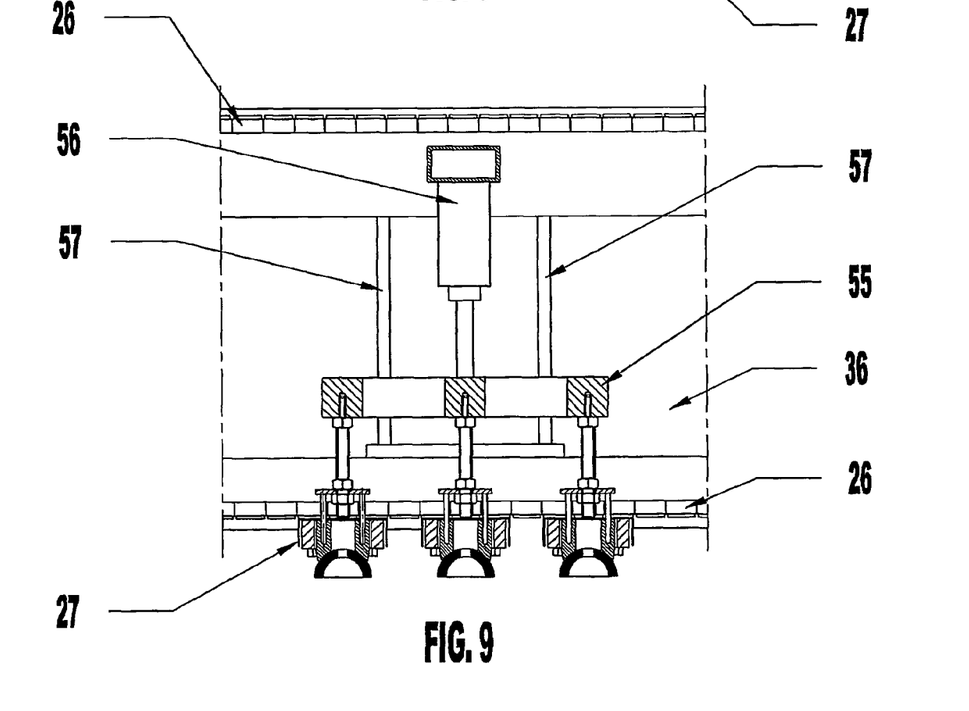
FIG. 9 is a view similar to FIG. 8 showing the ejection means at the lower end of an operating stroke.

The ejection means of the unloading station are virtually the same as the insertion means. They comprise a platen frame 55 able to rise and fall under the influence of two double acting pneumatic thrustors 56 (one near each end of the frame 41) on two pairs of guide rods 57, and fifty-seven plungers 58 in respective alignment with the moulds in the unloading station.

Figure 14:
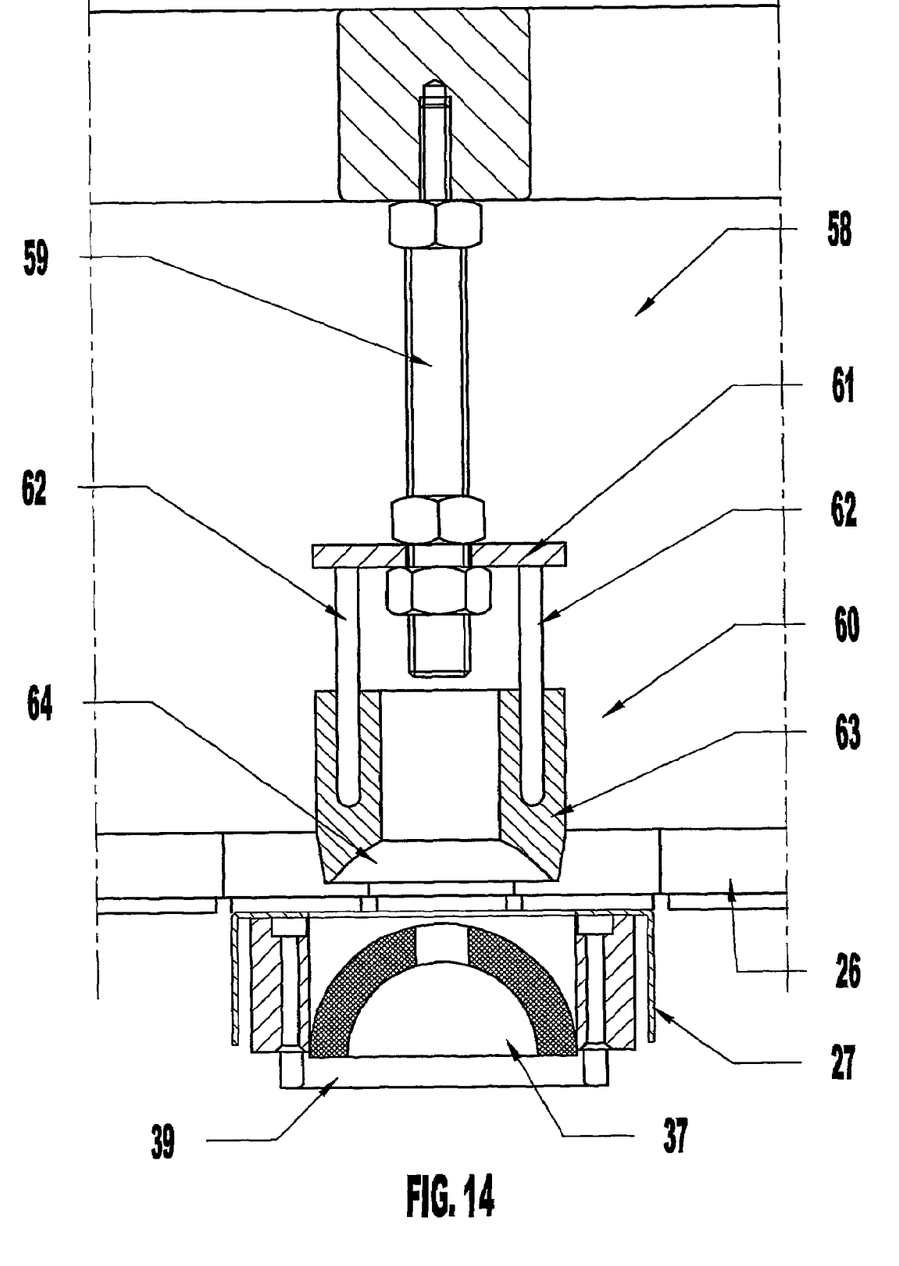
FIG. 14 is a partly sectioned side elevation of a single unit of the ejection means shown in FIG. 8 drawn to a larger scale.
Figure 15:
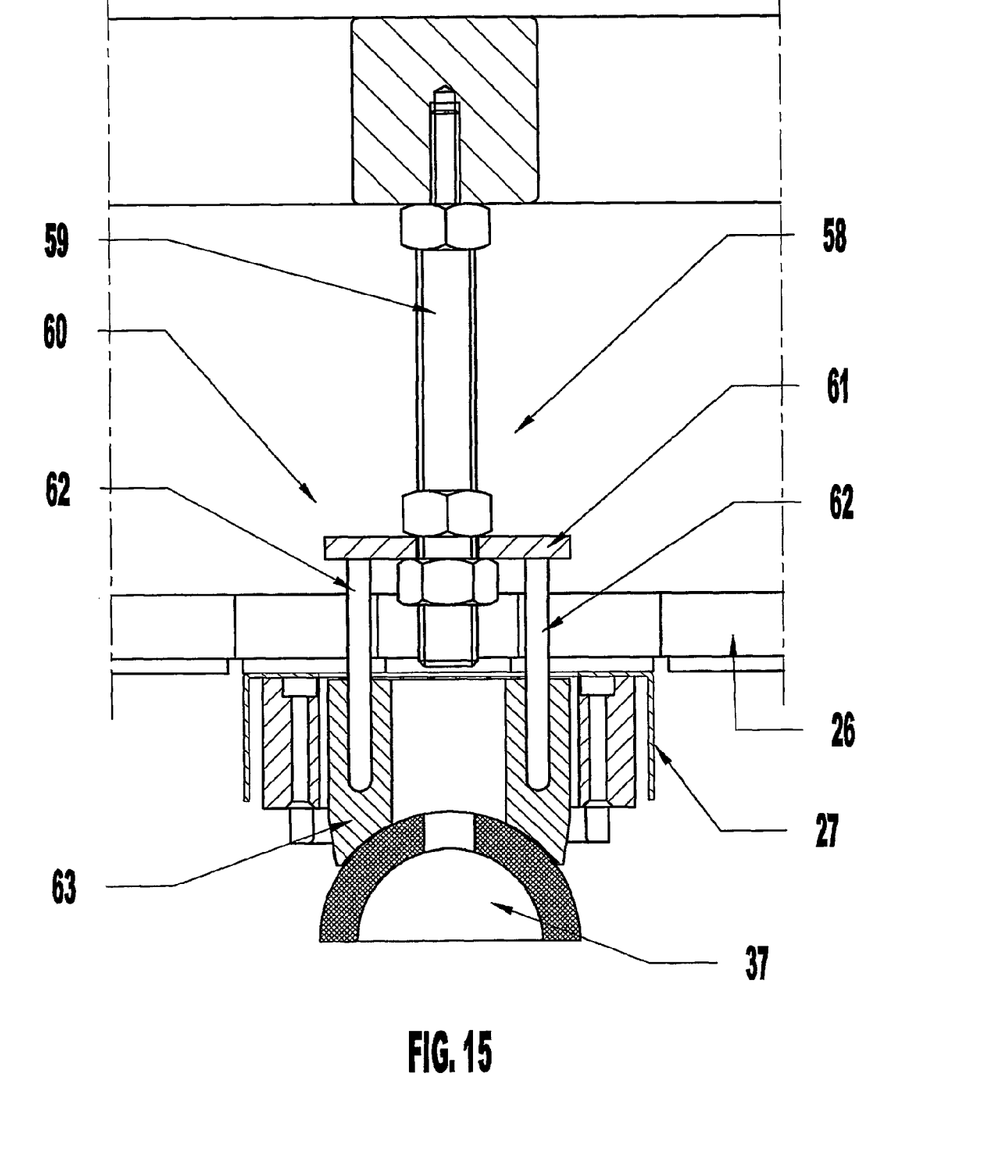
FIG. 15 is a partly sectioned side elevation of a single unit of the ejection means shown in FIG. 9 drawn to a larger scale.

As may best be seen in FIGS. 14 and 15, each plunger 58 comprises a plunger rod 59 and a plunger head 60, which distinguishes it from the plunger head 45 of the insertion means. The plunger head 60 comprises a plate 61, two struts 62 and a thick-walled tubular element 63 with a concave annular end face 64 conforming to the convex surface of the shaped workpiece 37. As the plunger 58 descends from the upper (FIG. 14) position to the lower (FIG. 15) position it pushes the workpiece 37 ahead of it from the mould cavity to fall into a box or other collection container (not shown).

Whilst not shown in the drawings, the apparatus of the present invention is provided with an array of light emitting diodes (LEDs) each of which is adjacent and associated with a respective heating unit 50. The LEDs are wired to the heating circuit in such a manner, that when a bulb of a heating unit 50 bums out, the LED associated with the burnt out LED lights up indicating that location of the burnt out bulb In other embodiments of the invention functionally similar operating means may be used in the respective operating stations. For example means other than pneumatic thrusters may be used to shift the platen frames or their equivalent in the insertion and unloading station. The incandescent light bulbs of the heating station may be replaced by other heating devices. For example the concave surface of the workpiece may be heated by a brief exposure to a flame or other hot gas, by exposure to a radiant heating element, or by contact with a part-spherical hot "plate" or otherwise, sufficiently to cause a thin surface layer to melt without affecting the bulk of the precursor material below that surface.

The claims defining the invention are as follows:

1. A method of making a dome-shaped article from a workpiece of thermoplastics sheet material, comprising the steps of selecting a workpiece of thermoplastics foam sheet material in the form of a substantially flat, flexible disk having a smoothly curved periphery, forcing the workpiece into a mould cavity having a cross-section with a periphery of substantially the same shape as that of the workpiece but of smaller size, so as to cause the workpiece to adopt a domed shape displaying a concave side, heating said concave side to soften a surface layer thereof, then ceasing said heating to allow said surface layer to cool and harden to cause the workpiece to become self-sustaining in shape, and then removing the shaped workpiece from the mould cavity.

2. A method according to claim 1 wherein the step of forcing the workpiece into the mould cavity is effected by relative movement of a convex head and said mould.

3. A method according to claim 2 wherein said convex head conforms to the shape of the concave side of the workpiece.

4. A method according to claim 1 wherein said step of heating is effected by directing radiant energy onto said concave side of the workpiece.

5. A method according to claim 1 wherein said step of heating is effected by directing a hot fluid onto said concave side of the workpiece.

6. A method according to claim 1 wherein said step of heating is effected by contacting said concave side of the workpiece with a complementary convex hot body.

7. A method according to claim 1 wherein said cavity is open ended and said step of removing is effected by pushing the cooled workpiece through one end of the cavity.

8. A method according to claim 1 wherein said article is a sealing element for a vaginal speculum and said workpiece is an annulus.

9. A method according to claim 8 wherein said plastics foam is a closed cell polyethylene foam.

* * * * *